United States Patent
Lee et al.

(10) Patent No.: US 7,437,182 B2
(45) Date of Patent: Oct. 14, 2008

(54) WIRELESS COMMUNICATION METHOD AND APPARATUS USING MULTIPLE ANTENNAS AND MULTIPLE RANDOM BEAMS

(75) Inventors: Yong-hwan Lee, 151-744 Seoul National Univ., Sillim 9-dong, Gwanak-gu, Seoul 141-744 Seoul (KR); Sung-su Hwang, Seoul (KR)

(73) Assignee: Yong-hwan Lee, Seoul (KR)

( * ) Notice: Subject to any disclaimer, the term of this patent is extended or adjusted under 35 U.S.C. 154(b) by 884 days.

(21) Appl. No.: 10/836,588

(22) Filed: Apr. 30, 2004

(65) Prior Publication Data
US 2005/0181833 A1    Aug. 18, 2005

(30) Foreign Application Priority Data
Feb. 12, 2004    (KR) .................... 10-2004-0009276

(51) Int. Cl.
  *H04M 1/00* (2006.01)
(52) U.S. Cl. .................... 455/562.1; 455/63.1
(58) Field of Classification Search .................... 455/10, 455/13.3, 15, 17, 25, 506, 63.4, 67.13, 562.1, 455/63.1, 114.2, 277.1, 277.2, 278.1, 279.1, 455/296, 33.3; 370/328
See application file for complete search history.

(56) References Cited

U.S. PATENT DOCUMENTS 6,597,678 B1 *    7/2003    Kuwahara et al. ............ 370/342

OTHER PUBLICATIONS

Viswanath et al., "Opportunistic Beamforming Using Dumb Antennas" published in IEEE Transactions in Information Theory, vol. 48, No. 6, Jun. 2002.

Gozali et al., "The Impact of Multiuser Diversity on Space-Time Block Coding", published in IEEE Communications Letters, vol. 7, No. 5, May 2003.

Chung et al., "A Random Beamforming Technique in MIMO Systems Exploiting Multiuser Diversity", published in IEEE Journal on Selected Areas in Communications, vol. 21, No. 5, Jun. 2003.

\* cited by examiner

*Primary Examiner*—Edward Urban
*Assistant Examiner*—Tu X Nguyen
(74) *Attorney, Agent, or Firm*—The Webb Law Firm

(57) ABSTRACT

The object of the present invention is to provide a wireless communication method and apparatus, which obtains both Multi-User Diversity (MUD) and Multi-User Multiplexing (MUM) effects simultaneously using multiple beams having random weights. In the wireless communication method, a transmission stage having M antennas (M is an integer equal to or greater than 1) selects B reception stages (B is an integer equal to or greater than 1) among K reception stages (K is an integer equal to or greater than 1) each having N antennas (N is an integer equal to or greater than 1) and generates B beams to transmit B signals in a multiple-access transmission manner. In the wireless communication method, the weight vector $w_b = [w_{1,b}, w_{2,b}, \ldots, w_{M,b}]$ is determined to generate the b-th beam (b is an integer equal to or greater than 1 and equal to or less than B) corresponding to the b-th signal among B signals so as to determine the weight of output values respectively allocated to M antennas for the purpose of respectively generating B signals. The weight vector is determined so that respective elements thereof are determined to prevent interference between the different beams of B beams from exceeding a preset threshold. B signals are transmitted through B multiple channels obtained by generating B beams depending on the weights of elements.

12 Claims, 10 Drawing Sheets

WIRELESS COMMUNICATION METHOD AND APPARATUS USING MULTIPLE ANTENNAS AND MULTIPLE RANDOM BEAMS

BACKGROUND OF THE INVENTION

1. Field of the Invention

The present invention relates, in general, to wireless communication apparatuses and methods and, more particularly, to a wireless communication method and apparatus between multiple users, that efficiently utilizes limited wireless communication resources to increase the system capacity, and provides stable wireless communication environments so as to simultaneously transmit multiple signals to multiple users.

2. Description of the Related Art

Recently, in a wireless communication system in which a base station exchanges wireless signals with a large number of users, the increase of the capacity of wireless communication systems has become an important issue. Especially, since the next generation transmission system should be able to provide a variety of high-capacity services, such as wireless Internet and multimedia, to users existing in various states, such as mobile, nomadic and fixed states, the downlink requires a capacity higher than that of the uplink. Accordingly, the increase of the downlink capacity has become one of the most important concerns to the service providers.

Therefore, various techniques for increasing the system capacity have been suggested. One of such new techniques is an opportunistic scheduling technique, that utilizes the channel characteristics of respective users sent from a reception stage to be detected, and allows the data to be selectively transmitted using only a user channel having highest instantaneous signal-to-noise power ratio (SNR) through a scheduler provided in a transmission stage. When the opportunistic scheduling technique is utilized, the capacity of wireless communication systems can be increases in the case where a plurality of users exist in states with various dynamic ranges and speeds of channel variation. In this way, the technique of increasing the capacity using independent channel characteristics between multiple users is referred to as multi-user diversity (MUD). It is known that the MUD technique can provide a system capacity higher than that in Additive White Gaussian Noise (AWGN) channel in fading channel condition(refer to a first reference document entitled "Opportunistic beamforming using dumb antennas" by P. Viswanath, D. N. C. Tse and R. Laroia in IEEE Transaction on Information Theory, Vol. 48, No. 6, pp. 1277-1294, June 2002).

FIG. 1 illustrates a case where the above-described MUD technique using the opportunistic scheduling is applied to two users in a system using a single antenna. In FIG. 1, there is depicted a scheme of allocating communication resources to a user having the best channel quality at each instant using the channel qualities (e.g., the channel gain, SNR, rate, etc.) of respective users when the channels of different users are independently varying. A channel viewed from a transmission side is equivalent to a channel represented by a dotted line, so that this system provides an SNR higher than the average SNR of the respective users, thus having a system capacity higher than that of AWGN channel having the same average SNR.

However, if the dynamic range and speed of channel variation are low as in the case of fixed wireless access (FWA) or nomadic users, the MUD gain is significantly reduced, remarkably reducing the capacity improvement.

In order to alleviate the above problem and to maintain the advantage of the MUD technique, there has been recently proposed a random beamforming technique that compulsorily increases the dynamic range and speed of channel variation using multiple antennas, providing the diversity gain (refer to the first reference document) (a second reference document entitled "The impact of multiuser diversity in space-time block coding" by R. Goazli, R. M. Buehrer and B. D. Woerner, in IEEE Communications Letters, Vol. 7, pp. 420-424, May 2003). This technique is known more effective than a conventional multi-input multi-output (MIMO) or space-time coding (STC) technique from the aspect of capacity increase (the second reference document). Further, in the case when the correlation between the channels according to antennas is high, multiple antenna diversity techniques, such as the STC, and antenna multiplexing techniques, such as Bell Laboratories Layered Space-Time (BLAST), may not be effective. However, if the MUD technique is applied, the channels between the respective users are independent even in an environment where the correlation between the channels according to antennas is high. Thus we can obtain a gain regardless of the correlation between the channels.

FIG. 2 illustrates the configuration of a random beamforming scheme (the first reference document) comprising a multi-input single-output (MISO) system and compulsorily varying a channel by using multiple antennas, such as array antennas, in the transmitter. In FIG. 2, the transmitter output signal s(t) is multiplied by a weight vector $w(t)=[w_1(t), w_2(t), \ldots, w_M(t)]^T$ for each antenna and then transmitted in a form of x(t)=w(t)s(t), where the superscript T represents the transpose of a vector. The weight vector can be generated by the following equation [1], $$w_m = \sqrt{\alpha_m(t)} e^{j\theta_m(t)}, \; m=1, 2, \ldots, M \quad [1]$$

where $\alpha_m(t)$ and $\theta_m(t)$ are random variables varying in the range of $0 \leq \alpha_m(t) \leq 1$ and $0 \leq \theta_m(t) < 2\pi$, respectively. For normalization of the total transmission power, it is assumed that $$\sum_{m=1}^{M} |\sqrt{\alpha_m(t)}|^2 = 1.$$

At this time, the received signal of the k-th user passing through the channel $h_k^H(t)=[h^*_{1,k}(t), h^*_{2,k}(t), \ldots, h^*_{M,k}(t)]$ is expressed by the following equation [2], $$Y_k(t) = h_k^H(t)w(t)s(t) + z_k(t), \; k=1, 2, K, K \quad [2]$$

where the superscript H denotes the Hermitian of a vector and $z_k(t)$ represents the noise of the k-th user that is assumed zero mean AWGN with a variance of $\sigma^2_z$. The channel recognized by the receiver is expressed by the following Equation [3].

$$h_k^*(t) = h_k^H(t)w(t) \quad [3]$$

$$= \sum_{m=1}^{M} h^*_{m,k}(t) \sqrt{\alpha_m(t)} \; e^{j\theta_m(t)}$$

If multiple antennas with random weight are used as described in the above, the dynamic range and speed of channel variation detected by the receiver can be increased, so that the capacity can be increased by the application of the above-described MUD technique.

FIG. 3 illustrates that the dynamic range of channel variation is increased by utilizing the above-described random beamforming scheme. With respect to very slowly varying channel or Rician channel, the speed and dynamic range of channel variation can be adjusted by adjusting the variation frequency of the weight of the random beam. Through this method, it was reported that the capacity can be increased when a multi-user diversity scheme is applied to fixed wireless channel or etc. (the first reference document). However, in Rayleigh fading channel having large dynamic range and high speed of channel variation, the effect of further increasing the dynamic range and speed of channel variation by the random beamforming is insignificant. Therefore, this method may not provide a large gain.

Recently, there has been an attempt to combine the random beamforming technique and MIMO singular value decomposition (SVD) based multiplexing technique together (refer to a third reference document entitled "A random beamforming technique in MIMO systems exploiting multiuser diversity" by J. Chung, C. S. Hwang, K. Kim and Y. K. Kim, in IEEE Journal on Selected Areas in Communications, Vol. 21, No. 5, pp. 848-855, June 2003). In this technique, all the mobile stations should employ multiple antennas and perform the SVD processing, requiring a large implementation complexity. Moreover, a large amount of channel information should be sent to the transmitter. If the correlation between the channels of antennas is high, the MIMO SVD technique may not be effective.

In the meantime, there has been an attempt to devise a multiplexing scheme by forming a plurality of orthogonal beams through multiple antennas while exploiting a random beamforming scheme. Thus, this method can utilize opportunistic scheduling and multi-user diversity technique (refer to the first reference document). However, this method may suffer from mutual interference between multiple beams when the number of users is small, yielding a system capacity smaller than that of a single beam scheme. Moreover, this method needs the use of multiple pilot signals as many as the number of beams.

SUMMARY OF THE INVENTION

Accordingly, the present invention has been made keeping in mind the above problems occurring in the prior art, and an object of the present invention is to provide a wireless communication method and apparatus, which obtains both the effect of multi-user diversity (MUD) and the effect of multi-user multiplexing (MUM) together using multiple beams having random weights, thus maximizing the transmission capacity.

Another object of the present invention is to provide a wireless communication method and apparatus, that generates multiple beams so that they interfere with each other in a controlled manner, enabling to obtain the effect of MUM through the formation of multiple beams while obtaining the effect of MUD through a random beamforming scheme Since the number of users simultaneously sharing the same channel resources increases, the present invention can maximize both the MUD and MUM effect regardless of the channel condition A further object of the present invention is to provide a wireless communication method and apparatus, in which a transmitter generates multiple beams having controllable interferences therebetween through the use of multiple antennas, without making the multiple beams orthogonal to each other, to obtain both the MUD and MUM effect together, so that the system capacity can be increased even when the number of users is small, unlike the scheme of the first reference document, and the method and apparatus can be applied to both MIMO and MISO systems.

In accordance with a first aspect of the present invention, there is provided a wireless communication method, in which a transmission stage having M antennas (M is an integer equal to or greater than 1) selects B reception stages (B is an integer equal to or greater than 1) among K reception stages (K is an integer equal to or greater than 1) each having N antennas (N is an integer equal to or greater than 1) and generates B beams to transmit B signals in a multiple-access transmission manner, the method comprising determining a weight vector $w_b = [w_{1,b}, w_{2,b}, \ldots, w_{M,b}]$ required to generate a b-th beam (b is an integer equal to or greater than 1 and equal to or less than B) corresponding to a b-th signal among the B signals so as to determine weights of output values respectively allocated to the M antennas for the purpose of respectively generating the B signals, the weight vector being determined so that respective elements thereof are determined to prevent interference between different beams of the B beams from exceeding a preset threshold; and transmitting the B signals through B multiple channels obtained by generating the B beams depending on weights of the elements.

In accordance with a second aspect of the present invention, there is provided a wireless communication method, in which a transmission stage having M antennas (M is an integer equal to or greater than 1) selects B reception stages (B is an integer equal to or greater than 1) among K reception stages (K is an integer equal to or greater than 1) each having N antennas (N is an integer equal to or greater than 1) and transmits B signals in a multiple-access transmission manner, the method comprising randomly determining weights of elements, a number of which is equal to or less than M−b+1, of M elements composing a weight vector $w_b = [w_{1,b}, w_{2,b}, \ldots, w_{M,b}]$ so as to determine respective elements of the weight vector required to generate a b-th beam corresponding to a b-th signal among the B signals using the M antennas; determining weights of remaining b−1 elements so as to prevent interference of the b-th beam to a channel of another previously selected beam from exceeding a preset threshold; and determining a reception stage having a maximum signal-to-interference plus noise power ratio (SINR) with respect to the b-th beam.

In accordance with a third aspect of the present invention, there is provided a wireless communication apparatus, in which a transmission stage having M antennas (M is an integer equal to or greater than 1) selects B reception stages (B is an integer equal to or greater than 1) among K reception stages (K is an integer equal to or greater than 1) each having N antennas (N is an integer equal to or greater than 1) and generates B beams to transmit B signals in a multiple-access transmission manner, the apparatus comprising means determining a weight vector $w_b = [w_{1,b}, w_{2,b}, \ldots, w_{M,b}]$ required to generate a b-th beam (b is an integer equal to or greater than 1 and equal to or less than B) corresponding to a b-th signal among the B signals so as to determine weights of output values respectively allocated to the M antennas for the purpose of respectively generating the B signals, the means determining respective elements of the weight vector to prevent interference between different beams of the B beams from exceeding a preset threshold; and means transmitting the B signals through B multiple channels obtained by generating the B beams depending on weights of the elements.

In accordance with a fourth aspect of the present invention, there is provided a wireless communication apparatus, in which a transmission stage having M antennas (M is an integer equal to or greater than 1) selects B reception stages (B is an integer equal to or greater than 1) among K reception stages (K is an integer equal to or greater than 1) each having N antennas (N is an integer equal to or greater than 1) and transmits B signals in a multiple-access transmission manner, the apparatus comprising means randomly determining weights of elements, a number of which is equal to or less than M−b+1, of M elements composing a weight vector $w_b = [w_{1,b}, w_{2,b}, \ldots, w_{M,b}]$ so as to determine respective elements of the weight vector required to generate a b-th beam corresponding to a b-th signal among the B signals using the M antennas; means determining weights of remaining b−1 elements so as to prevent interference of the b-th beam to a channel of another previously selected beam from exceeding a preset threshold; and means determining a reception stage having a maximum SINR with respect to the b-th beam.

Preferably, the wireless communication method and apparatus may be constructed to compare a first instantaneous capacity of the entire system obtained when the B beams are used, with a second instantaneous capacity of the entire system obtained when a single beam is used, and to transmit a signal using only a single beam when the first instantaneous capacity is less than the second instantaneous capacity.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, embodiments of the present invention will be described in detail with reference to the attached drawings.

For understanding of the construction of the present invention, the principles thereof are described in brief. A plurality of random beams causing mutual interference therebetween, the intensity of which can be controlled, are formed and communication resources are simultaneously allocated to multiple users, thus obtaining a multiplexing gain in the multi-user domain. If a service is simultaneously provided to a plurality of users, the transmission power allocated to each user is reduced in proportion to the number of users, so that the SNR is decreased. However, since the MUM gain using multiple random beams is larger than the decrease of the SNR, we can get a higher system capacity.

Further, since the construction of the present invention, which will be described later, can control mutual interference between the beams, unlike a conventional multiplexing technique using orthogonal beams, the effect of increasing a system capacity with respect to a small number of users can be guaranteed, and a multiplexing gain can be obtained even in a channel having a higher correlation.

Figure 1:
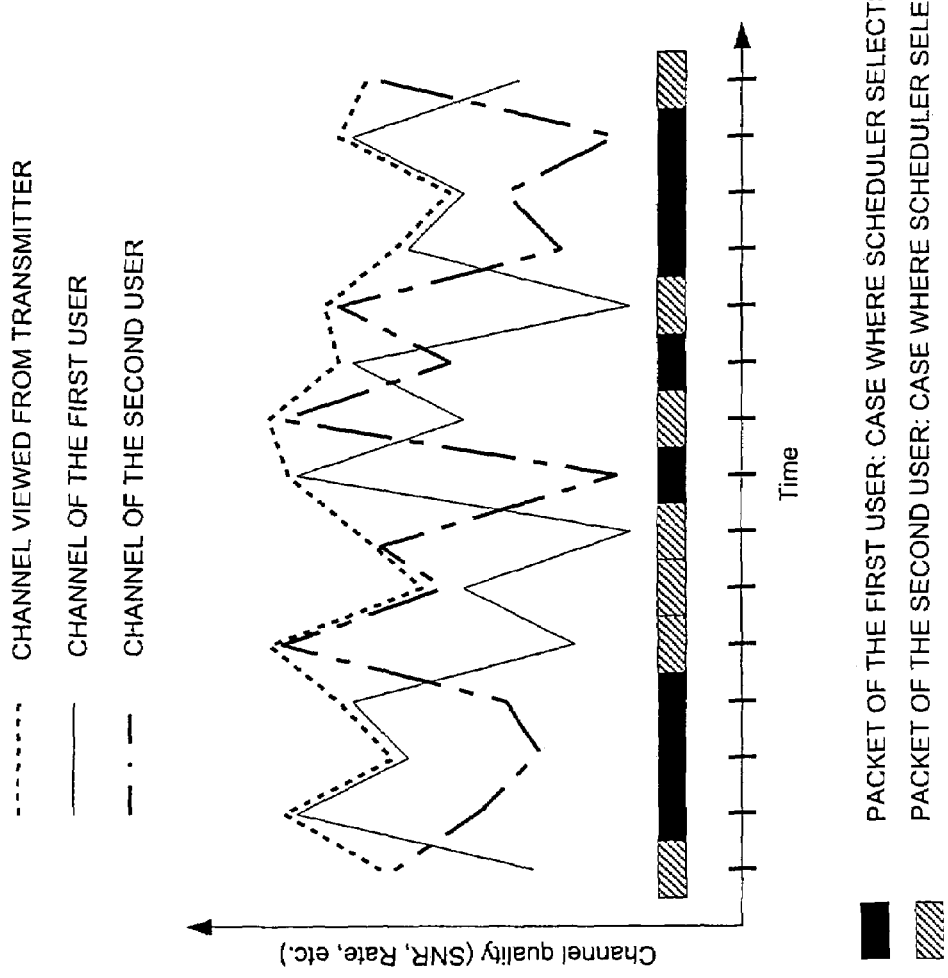
FIG. 1 illustrates a case where a MUD technique using opportunistic scheduling is applied to two users in a system using a single antenna.
Figure 2:
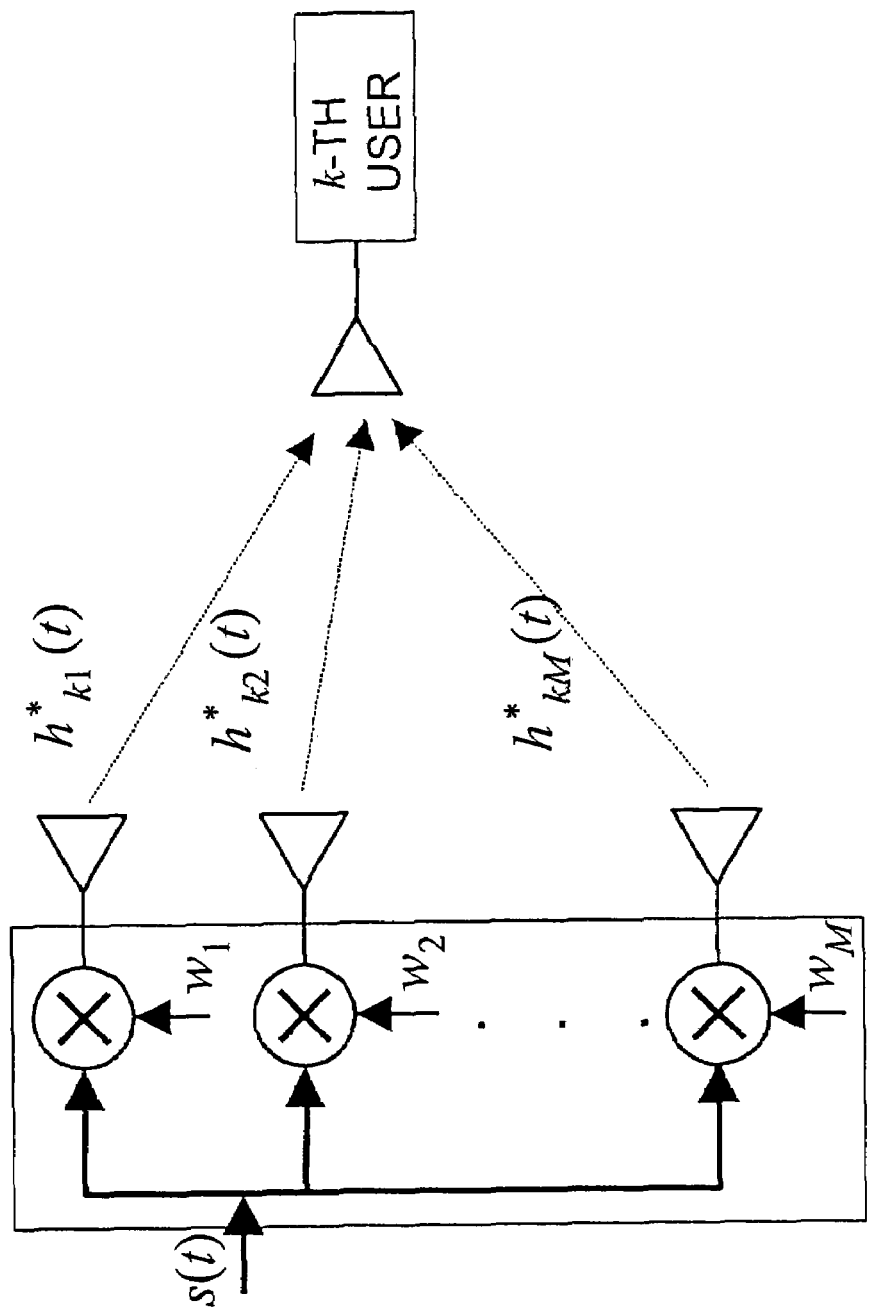
FIG. 2 illustrates the configuration of a random beamforming scheme (the first reference document) of constructing an MISO system and compulsorily varying a channel by applying multiple antennas, such as array antennas, to a transmitter.
Figure 3:
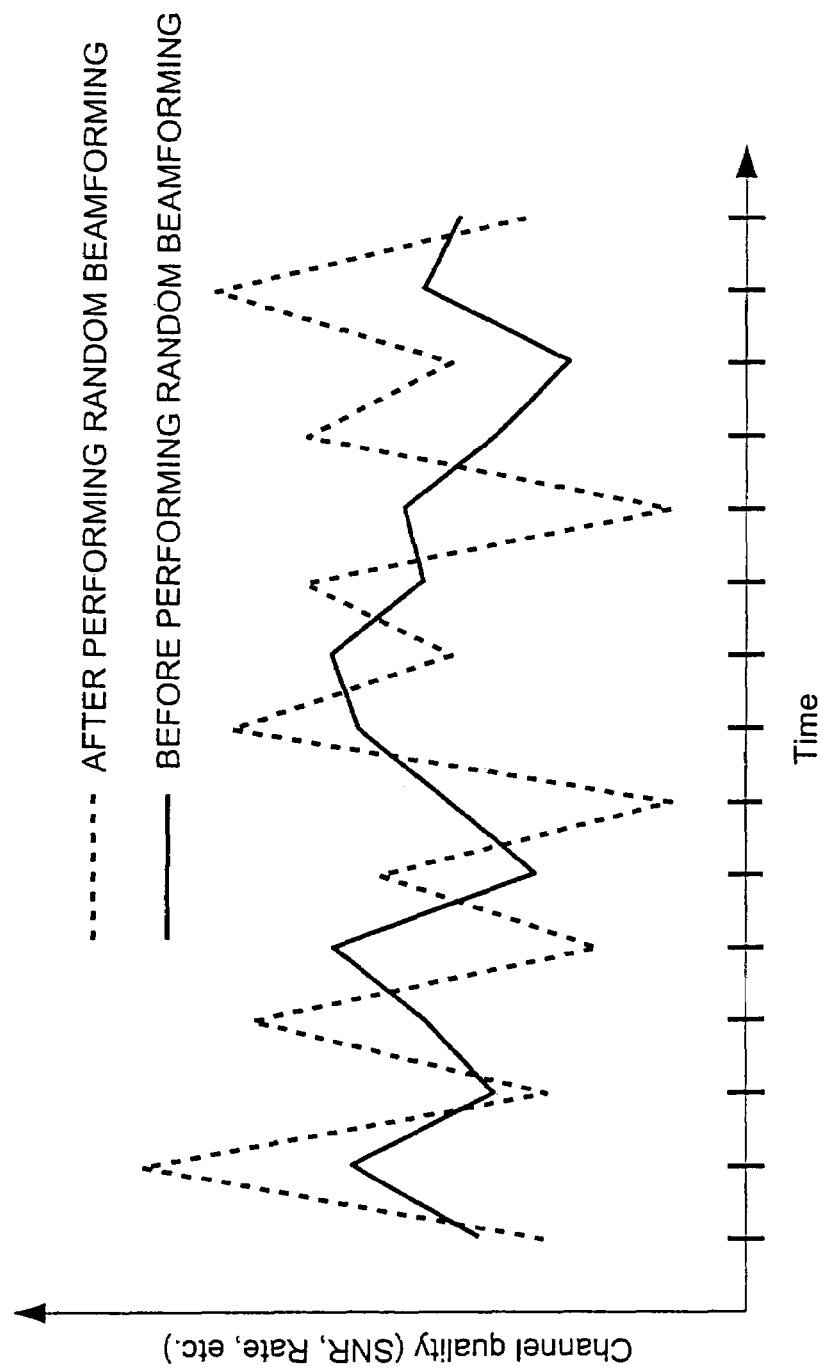
FIG. 3 illustrates that the dynamic range of channel variation of a user is increased by utilizing the random beamforming scheme.
Figure 4:
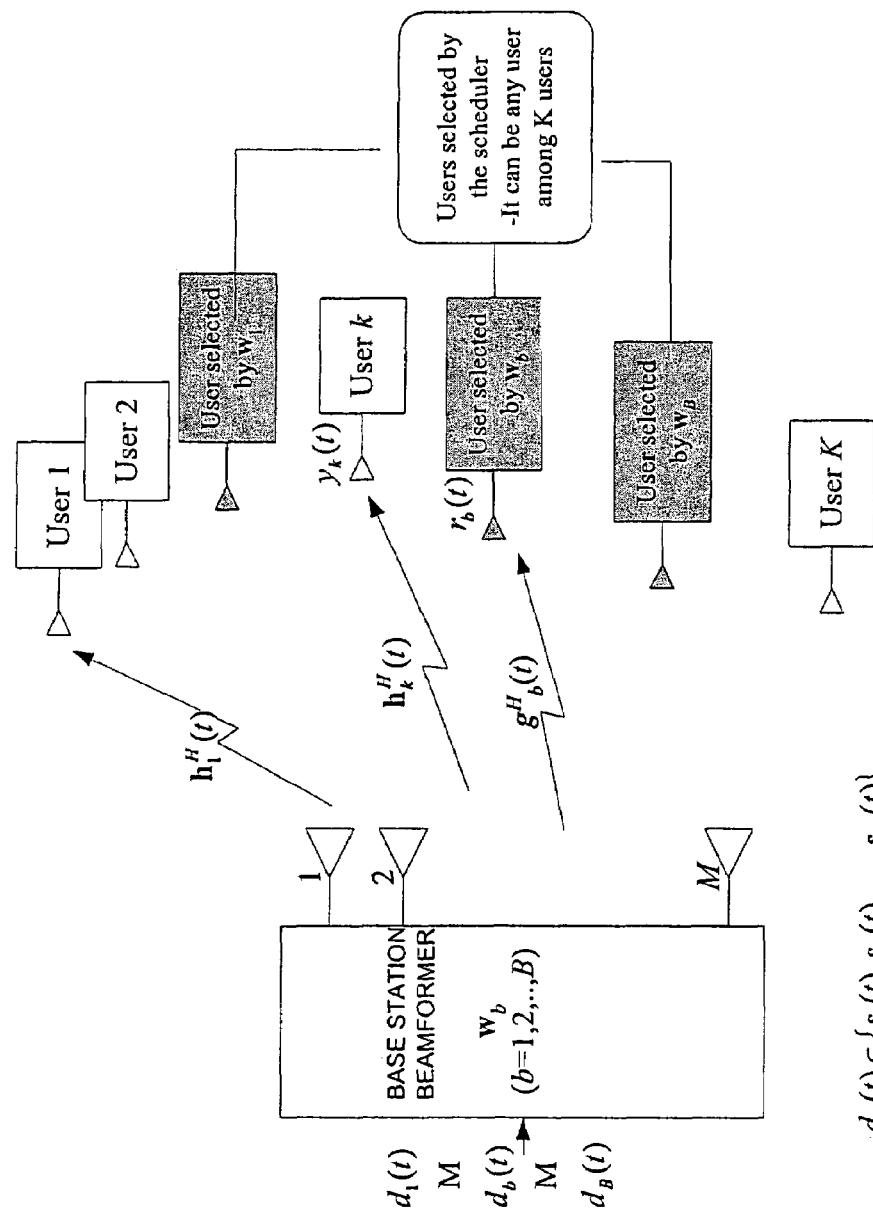
FIG. 4 is a schematic block diagram of a wireless communication apparatus according to an embodiment of the present invention.

FIG. 4 is a block diagram of a wireless communication apparatus according to an embodiment of the present invention.

Hereinafter, the construction of a wireless communication apparatus and method proposed in the present invention will be described in detail on the basis of a MISO structure, and then it will be proved that the present invention can also be applied to a MIMO structure.

A transmitter shown in FIG. 4 multiplexes B signals $\{d_1(t), d_2(t), \ldots, d_B(t)\}$ and simultaneously transmits B signals to B users among K users. If the weight vectors used for the multiplexing are $\{w_1(t), w_2(t), \ldots, w_B(t)\}$, the signal received by an arbitrary k-th user can be expressed by the following Equation [4], $$y_k(t) = h_k^H(t) \sum_{b=1}^{B} w_b(t) d_b(t) + z_k(t), \quad k = 1, 2, \ldots, K \qquad [4]$$

A scheduler selects B users having the highest channel quality with respect to the respective beams among K users. Therefore, a transmitted signal $d_b(t)$ is one of the signals of K users. That is, a relation of $d_b(t) \in \{s_1(t), s_2(t), \ldots, s_K(t)\}$, b=1, 2, \ldots, B is satisfied.

In this case, it is assumed that the respective signals have the same power $\sigma_s^2$. A channel $g_i(t)$ selected for the i-th beam has a relation of $g_i(t) \in \{h_1(t), h_2(t), \ldots, h_K(t)\}$, i=1, 2, \ldots, B, and a signal $r_i(t)$ received through the i-th beam selected by the scheduler is expressed by the following Equation [5], $$\begin{aligned} r_i(t) &= y_p(t) \\ &= h_p^H(t) \left[ w_i(t) s_p(t) + \sum_{b=1, \neq i}^{B} w_b(t) d_b(t) \right] + z_p(t) \\ &= g_i^H(t) w_i(t) d_i(t) + \sum_{b=1, \neq i}^{B} g_i^H(t) w_b(t) d_b(t) + z_p(t) \end{aligned} \qquad [5]$$

where k is the user index, and i is the beam index. If the scheduler selects the p-th user for the i-th beam (that is, b=i), the relations of $d_i(t)=s_p(t)$, $g_i(t)=h_p(t)$, and $r_i(t)=y_p(t)$ are satisfied. In Equation [5], the first term represents the transmitted signal components, the second term represents the interference signals generated when multiplexing is performed using multiple beams, and the third term represents noise.

Therefore, the SINR of the channel allocated by the i-th beam is given by the following Equation [6].

$$SINR_i = \frac{|g_i^H w_i|^2 \sigma_s^2}{\sum_{b=1, \neq i}^{B} |g_i^H w_b|^2 \sigma_s^2 + \sigma_z^2} \qquad [6]$$

In this case, it is assumed that the channel status is unchanged for one time slot, and thus the symbol t indicating the time is omitted. Therefore, if a beam weight satisfying the condition where the amount of mutual interference between the beams can be adjusted is generated as represented in Equation [7], simultaneous multiple transmissions are possible through the channels of a plurality of users while minimizing the interference therebetween, thus obtaining an MUM effect.

$$\begin{cases} g_i^H w_b = \varepsilon_1, & i \neq b \\ g_i^H w_b = \mu_1, & i = b \end{cases} \qquad [7]$$

In this case, if the weight of each beam satisfies the constraint of Equation [7], the SINR is given by Equation [8].

$$SINR_i = \frac{|\mu_i|^2 \sigma_s^2}{\sum_{j=1, \neq i}^{B} |\varepsilon_j|^2 \sigma_s^2 + \sigma_z^2}, \quad i = 1, 2, \ldots, B \qquad [8]$$

If matrix $W=[w_1, w_2, \ldots, w_B]$ composed of the weights of the respective beams, and matrix $G=[g_1, g_2, \ldots, g_B]$ composed of the channels selected by the respective beams are considered, a constraint required for the respective beams to have the SINR given by Equation [8] is obtained by the following Equation [9].

$$G^H W = F \qquad [9]$$

In this case, constraint matrix F can be expressed by the following Equation [10].

$$F \triangleq \begin{bmatrix} \mu_1 & \varepsilon_1 & \varepsilon_1 & \Lambda & \varepsilon_1 \\ \varepsilon_2 & \mu_2 & \varepsilon_2 & \Lambda & \varepsilon_2 \\ \varepsilon_3 & \varepsilon_3 & O & & M \\ M & & & \mu_{B-1} & \varepsilon_{B-1} \\ \varepsilon_B & \varepsilon_B & \Lambda & \varepsilon_B & \mu_B \end{bmatrix} \qquad [10]$$

The respective elements composing the constraint matrix can be adjusted in association with the SINR value required by the system. For example, if two beams are used in a (2×1) MISO system, the constraint matrix can be determined as below.

$$F = \begin{bmatrix} \frac{1}{\sqrt{2}} & 0.01 \\ 0.01 & \frac{1}{\sqrt{2}} \end{bmatrix}$$

Assume an ideal case where there is no interference between multiple beams. If the signal is transmitted in a channel with an SNR of $\sigma_s^2/\sigma_z^2 = 100 = 20$ dB using two antennas, each of two channels have an SNR of 17 dB. In the above example, by using $\mu_i = 1/\sqrt{2}$, the total power is divided into two equal parts by two beams in Equation [1]. Letting $\varepsilon_i = 0.01$, in order to sufficiently decrease the interference compared to the background noise, we can obtain $SINR_i = (\sigma_s^2/2)(|0.01|^2 \sigma_s^2 + \sigma_z^2) = 16.95$ dB by the above Equation [8]. Therefore, two channels very similar to those of the ideal case can be produced.

Figure 5:
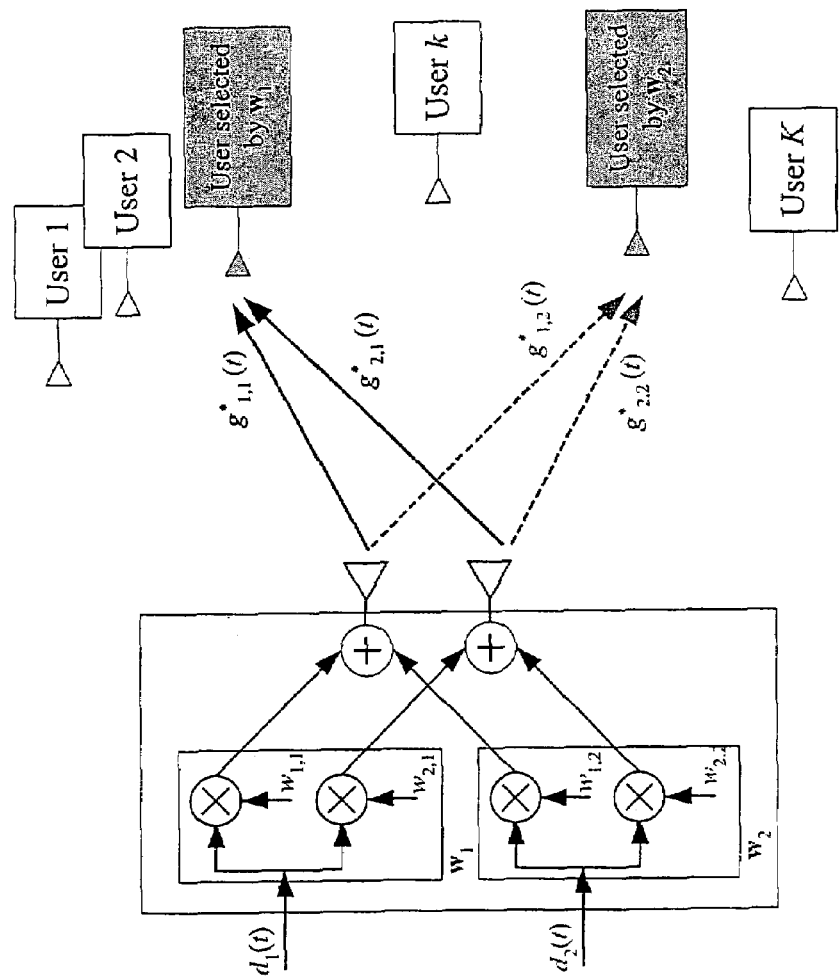
FIG. 5 illustrates a case where two beams are used in a (2×1) MISO system to describe the principles of a multiple beam scheme proposed in the present invention.

In FIG. 5, in order to describe the principles of a multiple beam scheme proposed in the present invention, a case where a (2×1) MISO system uses two beams is depicted. If the transmitter simultaneously transmits two signals $d_1(t)$ and $d_2(t)$ in a form of $w_1 d_1(t) + w_2 d_2(t)$ using weights $w_1 = [w_{1,1}, w_{2,1}]^T$ and $w_2 = [w_{1,2}, w_{2,2}]^T$, the signal received by the k-th user is given by the following Equation [11].

$$y_k(t) = h_k^H(t) w_1(t) d_1(t) + h_k^H(t) w_2(t) d_2(t) + z_k(t) \qquad [11]$$

At this time, the SINR values obtained by the respective beams for each user are given by Equations [12] and [13].

$$\text{SINR obtained by the first beam}: SINR_{1,k} = \frac{|h_k^H w_1|^2 \sigma_s^2}{|h_k^H w_2|^2 \sigma_s^2 + \sigma_z^2} \qquad [12]$$

$$\text{SINR obtained by the second beam}: SINR_{2,k} = \frac{|h_k^H w_2|^2 \sigma_s^2}{|h_k^H w_1|^2 \sigma_s^2 + \sigma_z^2} \qquad [13]$$

Figure 6:
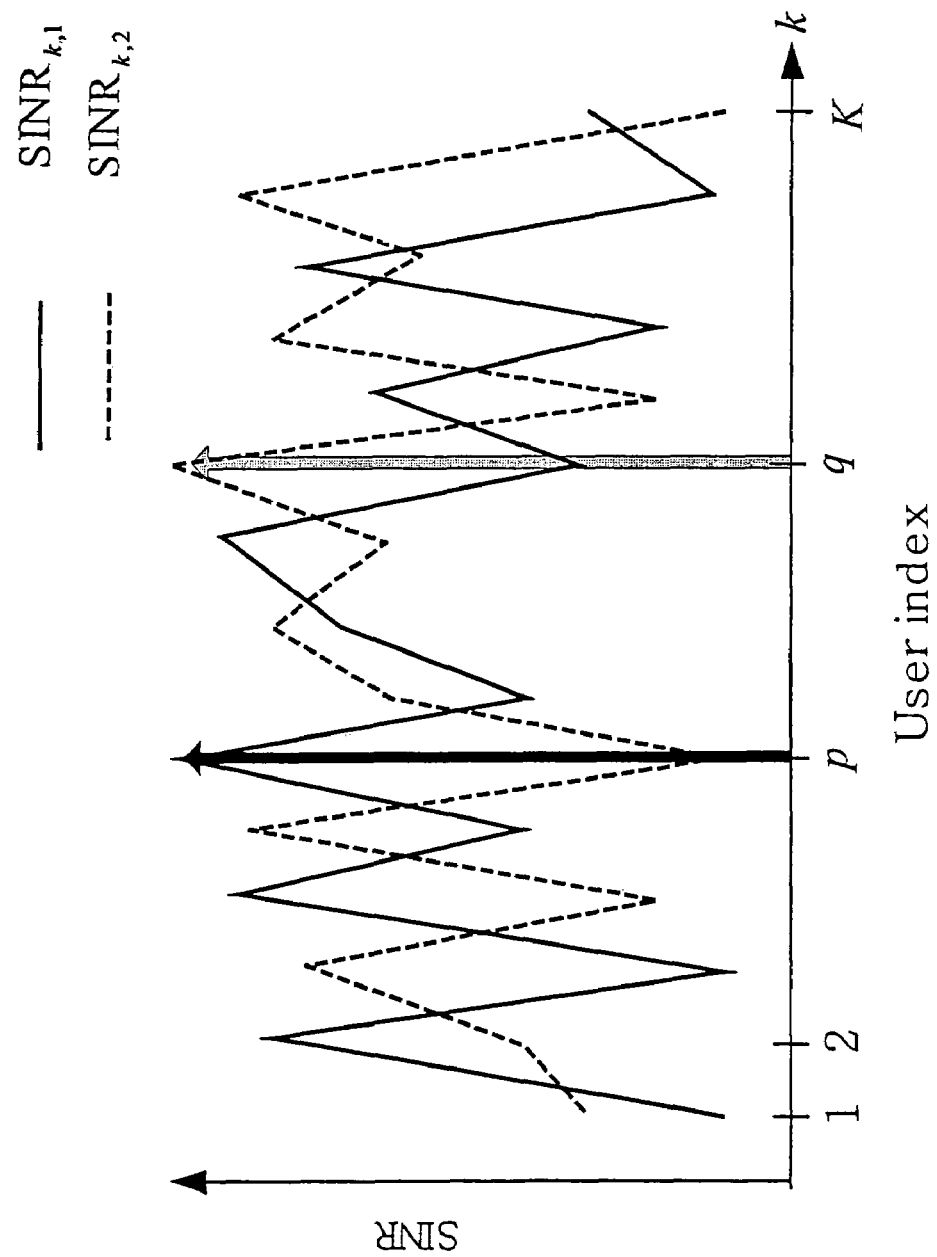
FIG. 6 is a view showing the example of an SINR value of each user obtained by equation [12] and [13] by applying a channel $h_k$ for each user to equation [12] and [13]

FIG. 6 illustrates an example of the SINR values for each user obtained by Equations [12] and [13] by applying a channel $h_k$ for each user to Equations [12] and [13]. As shown in FIG. 6, since the p-th and q-th user have the best SINR value for the first and second beams, respectively, with respect to the respective channels, the scheduler selects the p-th and q-th users for the first and second beams, respectively. That is, $g_1(t) = h_p(t)$ and $g_2(t) = h_q(t)$.

If the SNR of the k-th user at the l-th time slot is $SNR_k(l)$, the total capacity of a system using the multi-user diversity can be obtained by the following Equation [14].

$$C = \frac{1}{L} \sum_{l=1}^{L} \max_k \{\log_2(1 + SNR_k(l))\} \qquad [14]$$

If a multiplexing technique using multiple beams is used, there is interference due to multiple user signals, so that the channel quality is determined by SINR, not by SNR. Further, if it is assumed that the SINR of the k-th user obtained by the b-th beam is at the l-th time slot is $SINR_{b,k}(l)$, the total capacity of the system can be obtained by Equation [15].

$$C_M = \frac{1}{L} \sum_{l=1}^{L} \sum_{b=1}^{B} \max_k \{\log_2(1 + SINR_{b,k}(l))\} \qquad [15]$$

If multiple beams are generated to satisfy Equation [9] on the average, the average power of each channel using multiple beams is decreased by 1/B compared to the case where a single beam is used, as expressed by Equation [16], in the case where the total transmission power is constant.

$$E\{\max_k [SINR_{b,k}(l)]\} = \frac{1}{B} E\{\max_k [SNR_k(l)]\} \stackrel{\text{let}}{=} \zeta \qquad [16]$$

However, if multiple beams are used, B channels are simultaneously used, so that the system capacity is increased in proportion to B.

A difference between the system capacities given by Equations [14] and [15] can be expressed by the following Equation [17].

$$C_M - C = B\log_2(1+\zeta) - \log_2(1+B\zeta) \quad [17]$$

$$= \log_2\left[\frac{(1+\zeta)^B}{1+B\zeta}\right]$$

$$= \log_2\left[1 + \frac{1}{1+B\zeta} \cdot \sum_{j=2}^{B}\binom{B}{j}\cdot\zeta^j\right] \geq 0, \zeta \geq 0$$

Figure 7:
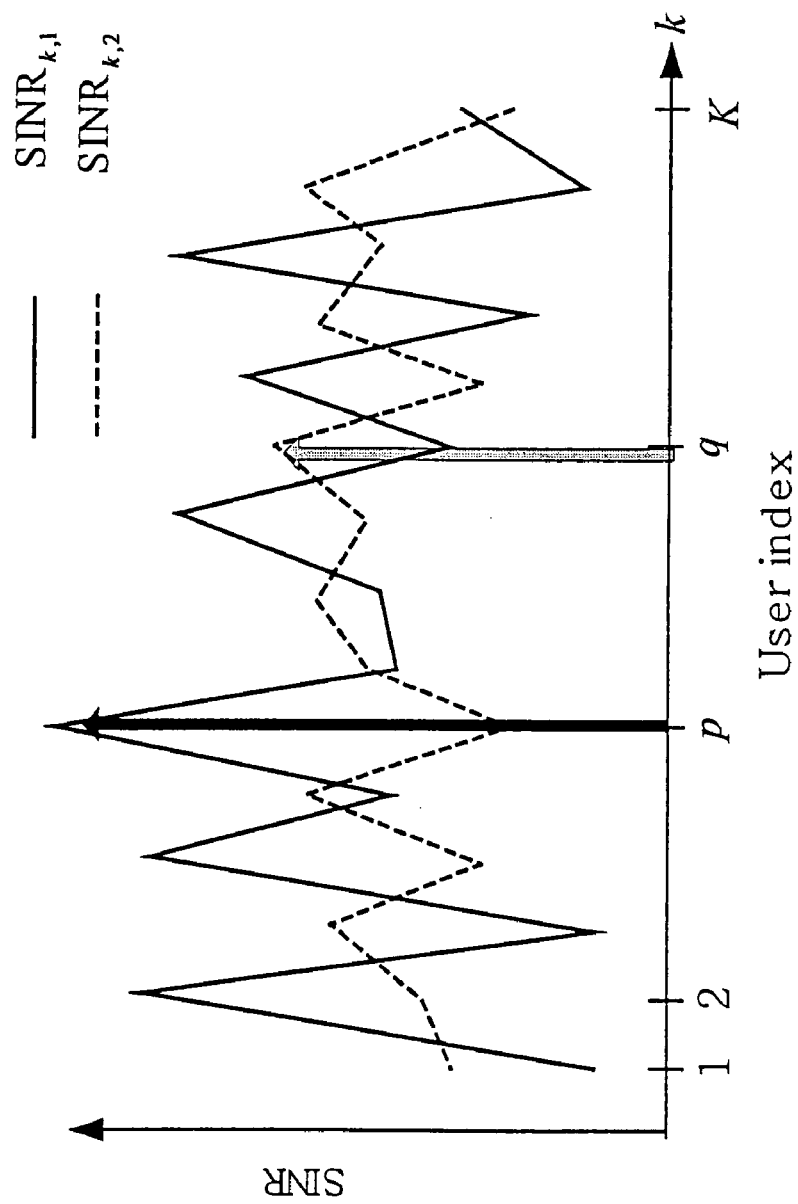
FIG. 7 illustrates a case where multiple beams are disadvantageously formed when one of conventional schemes is applied.

As shown in Equation [17], the final result value of Equation [17] is larger than or equal to "0". Accordingly, an increase in capacity can be expected through the use of a multiplexing technique, compared to a system always utilizing a single beam when multiple beams satisfying Equation [9] are used. FIG. 6 illustrates a case where a user satisfying Equation [9] by generated multiple beams exists in the p-th or q-th sequential position. However, in the case of FIG. 7, the maximum values of respective beams are generated in the p-th or q-th sequential position with respect to the generated multiple beams, but the q-th user can obtain a higher capacity by allocating the total power to a single beam rather than performing multiplexing using multiple beams because the SINR of the q-th user is low. If the conventional technique [the first reference document] using orthogonal multiple beams is used, a case equal to that of FIG. 7 may occur, so that the capacity may be decreased, compared to a case where a single beam is used, with respect to a small number of users. In contrast, the scheme proposed in the present invention forms multiple beams while satisfying the constraint given by Equation [9], thus obtaining an increase in capacity.

Figure 8:
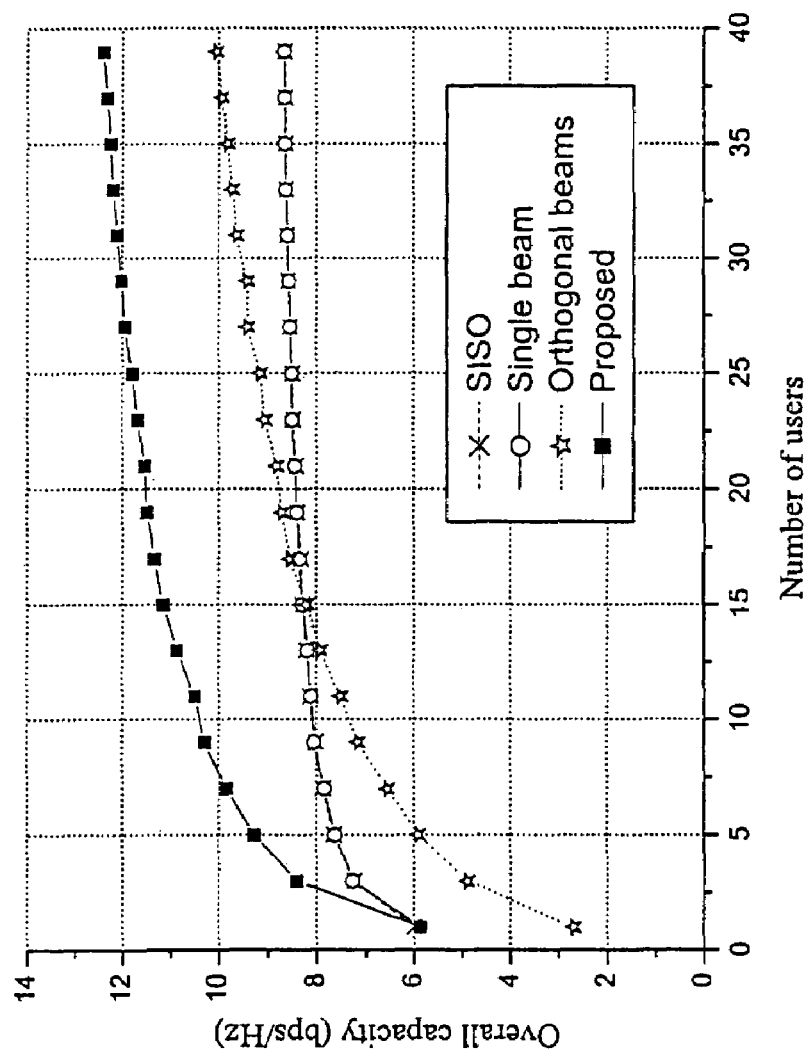
FIG. 8 illustrates an example of the increase of actual capacity according to the increase of users obtained from experiments to which a plurality of schemes are applied.

FIG. 8 illustrates an example of the increase of actual capacity according to the increase of users obtained from experiments to which a plurality of schemes are applied. The results of the prior art utilizing only MUD using a single antenna are represented by "SISO", the results of the prior art performing random beamforming using only a single beam are represented by "Single beam", the results of the prior art performing multiplexing using orthogonal beams are represented by "Orthogonal beams", and the results of the multiplexing technique using multiple beams proposed in the present invention are represented by "Proposed". The experiments were executed in fast Rayleigh fading channel, in which channel condition is changed at each time slot, at an SNR of 20 dB. As shown in FIG. 8, it can be seen that the technique proposed in the present invention always provides remarkable increase in the capacity.

Hereinafter, a scheme of generating the weight vector of multiple beams to obtain a multi-user diversity effect is described. The first beam is generated in a random manner by the following Equation [18], $$w_1 = [w_{1,1}, w_{2,1}, \ldots, w_{M,1}]^T$$

$$w_{m,1} = \sqrt{\alpha_{m,1}}e^{j\theta_{m,1}}, m=1, 2, \ldots, M \quad [18]$$

where $\alpha_{m,b}$ and $\theta_{m,b}$ represent uniform random variables in the ranges of [0,1] and [0, 2π], respectively, while satisfying $$\sum_{m=1}^{M}|\sqrt{\alpha_{m,b}}|^2 = 1,$$

and b represents the beam index. If a channel selected by the scheduler for the first beam is $g_1$, the second beam $w_2$ should satisfy a constraint of $g_1^H w_2 = \epsilon$ so as to satisfy the constraint of Equation [7]. In this case, an indeterminate equation with one constraint and M variables is obtained. Therefore, if (M−1) variables are randomly determined as in Equation [18], and the equation is solved with respect to only the remaining one variable, the weight vector of the second beam can be obtained by the following Equation [19], $$w_{m,2} = \begin{cases} \frac{1}{\sqrt{p_2}} \cdot \sqrt{\alpha_{m,2}}\, e^{j\theta_{m,2}}, & m = 1, 2, \ldots, M-1 \\ \frac{1}{\sqrt{p_2}} \cdot \frac{1}{g_{M,1}^*} \cdot \left[\epsilon - \left(\sum_{m=1}^{M-1} g_{m,1}^* \sqrt{\alpha_{m,2}}\, e^{j\theta_{m,2}}\right)\right], & m = M \end{cases} \quad [19]$$

where $1/\sqrt{p_b}$ is a constant to satisfy a normalization constraint of $\|w_b\|^2=1$.

Generally, the weighting of the b-th beam can be generated by randomly determining (M−b+1) weights and determining the remaining (b−1) weights using linear simultaneous equations $g_i^H w_b = \epsilon$ for i=1, 2, ..., b−1. The solution of the b-th beam is expressed in Equation [20], $$w_b = \begin{bmatrix} w_{rand} \\ w_{sol} \end{bmatrix} \quad [20]$$

where $w_{rand}$ and $w_{sol}$ are given by Equations [21] and [22], respectively.

$$(w_{rand})_m = \frac{1}{\sqrt{P_b}} \cdot \sqrt{\alpha_{m,b}}\, e^{j\theta_{m,b}}, m = 1, 2, \ldots, M-b+1 \quad [21]$$

$$w_{sol} = \frac{1}{\sqrt{P_b}} \begin{bmatrix} g_{M-b+2,1}^* & g_{M-b+3,1}^* & L & g_{M-1,1}^* & g_{M,1}^* \\ g_{M-b+2,2}^* & g_{M-b+3,2}^* & L & g_{M-1,2}^* & g_{M,2}^* \\ M & & & & M \\ g_{M-b+2,b-2}^* & & & O & g_{M,b-2}^* \\ g_{M-b+2,b-1}^* & g_{M-b+3,b-1}^* & L & g_{M-1,b-1}^* & g_{M,b-1}^* \end{bmatrix}^{-1} \begin{bmatrix} \epsilon - \sum_{m=1}^{M-b+1} g_{m,1}^* \sqrt{\alpha_{m,b}}\, e^{j\theta_{m,b}} \\ \epsilon - \sum_{m=1}^{M-b+1} g_{m,2}^* \sqrt{\alpha_{m,b}}\, e^{j\theta_{m,b}} \\ \epsilon - \sum_{m=1}^{M-b+1} g_{m,b-1}^* \sqrt{\alpha_{m,b}}\, e^{j\theta_{m,b}} \end{bmatrix} \quad [22]$$

Figure 9:
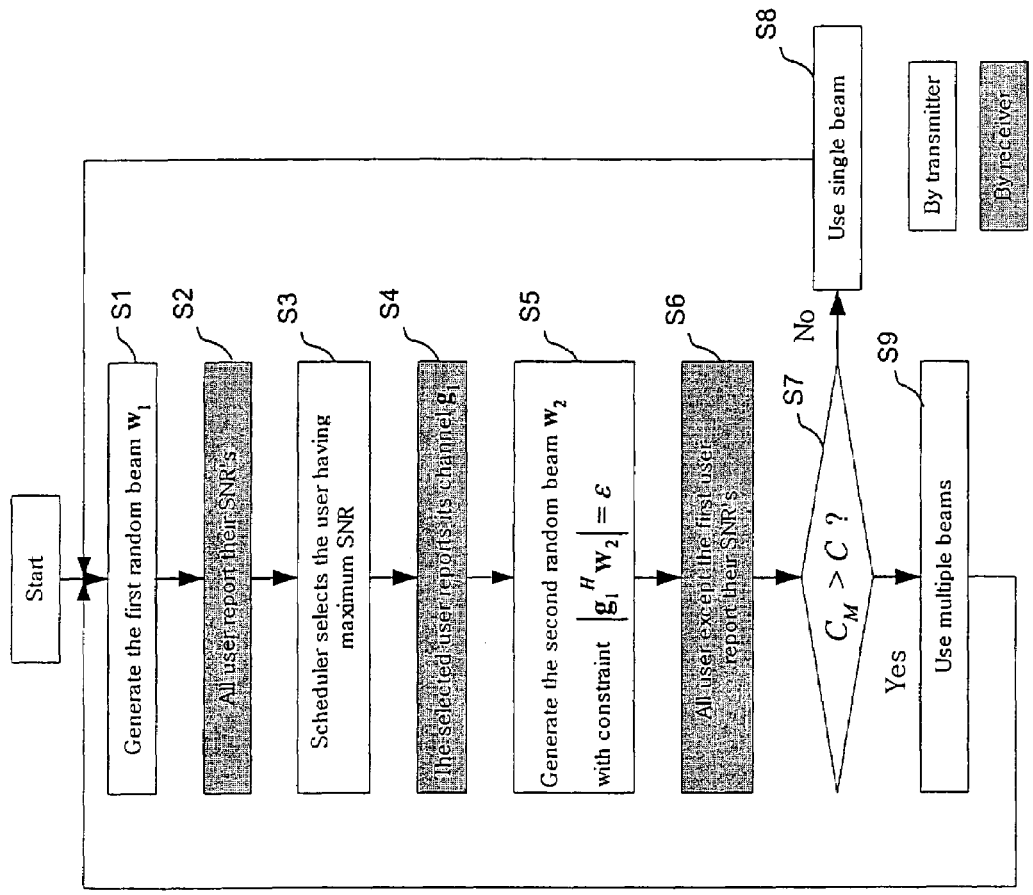
FIG. 9 is a flowchart of a method of generating the weight vector of a system using two random beams by applying the method of the present invention to, for example, a (2×1) MISO system.

FIG. 9 illustrates a flowchart for a method of generating the weight vector of a system using two random beams by applying the method of the present invention to, for example, a (2×1) MISO system. First, the weight of a first beam is generated and then the first beam is obtained at step S1, and a SNR value according to the first beam is reported at step S2, so that the user of the first beam satisfying a maximum SNR constraint is selected at step S3. The selected user reports its channel $g_1$ at step 4. Thereafter, a beam is generated as shown in Equation [20] to satisfy Equation [9] at step S5, and a second user having the maximum SINR constraint with respect to this beam is selected at step S6. At this time, it is determined whether the SINR value of the selected user satisfies Equation [17] at step S7. The method can be constructed so that a single beam is used when the SINR value does not satisfy Equation [17] at step S8, while multiple beams are used only when a gain due to multiplexing is generated at step S9.

Figure 10:
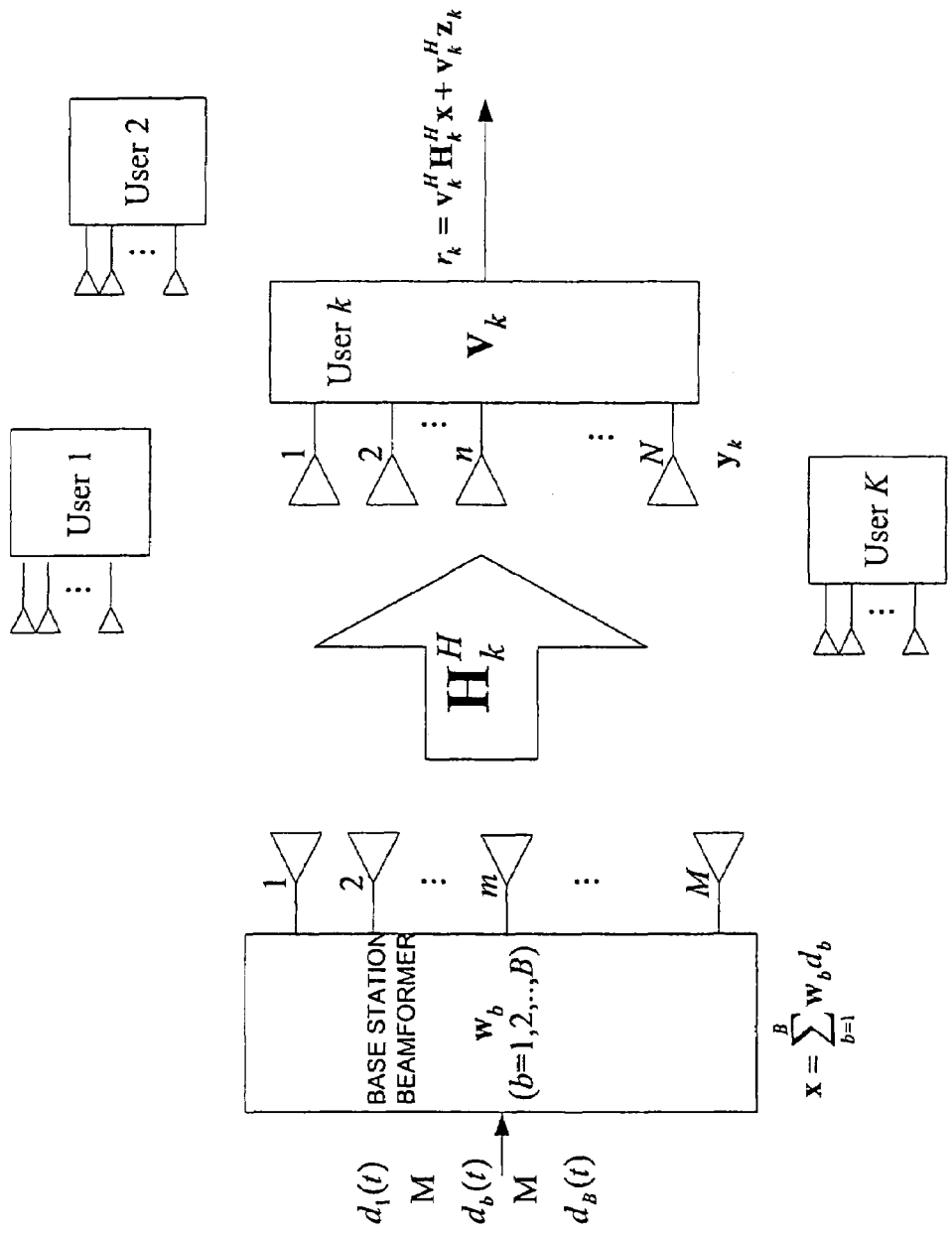
FIG. 10 illustrates an example in which the method of the present invention is applied to an (M×N) MIMO system.

The method of the present invention can also be applied to an (M×N) MIMO structure, as shown in FIG. 10. At this time, the transmitted signal can be expressed by the following Equation [23].

$$x(t) = \sum_{b=1}^{B} w_b(t) d_b(t) \quad [23]$$

The received signal vector of the k-th user is given by Equation [24] with respect to an (M×N) MIMO channel $H_k(t)$ of the k-th user.

$$y_k(t) = H_k^H(t) \sum_{b=1}^{B} w_b(t) d_b(t) + z_k(t), k = 1, 2, \ldots, K \quad [24]$$

In this case, it is assumed that the receiver employs a combining technique, such as Maximum Ratio Combining (MRC). If the weight vector of the receiver is assumed to be $v_k(t)=[v_{1,k}(t), v_{2,k}(t), \ldots, v_{N,k}(t)]$, the output obtained after the combining is expressed by Equation [25], $$r_k(t) = v^H(t) H_k^H(t) \sum_{b=1}^{B} w_b(t) d_b(t) + v^H(t) z_k(t)$$

$$= h_k^H(t) \sum_{b=1}^{B} w_b(t) d_b(t) + z'_k(t) \quad [25]$$

where $h_k^H(t) = v^H(t) H_k^H(t)$ and $z'_k(t) = v^H(t) z_k(t)$. Therefore, if a vector-format equivalent channel is defined for each user as shown in Equation [26], all of the techniques of the above-described MISO structure can be applied to the MIMO structure without change.

$$h_k^H(t) = v^H(t) H_k^H(t) \quad [26]$$

$$= \left[ \sum_{n=1}^{N} v_{n,k}^*(t) h_{n1,k}^*(t), \sum_{n=1}^{N} v_{n,k}^*(t) h_{n2,k}^*(t), \ldots, \sum_{n=1}^{N} v_{n,k}^*(t) h_{nM,k}^*(t) \right]$$

The wireless communication method and apparatus of the present invention can be modified and substituted to various forms, without departing from the technical scope and spirit of the present invention, and is not limited to the above embodiments. For example, the embodiments are described on the basis of a MISO system, but it is clear that the technical spirit of the present invention can be applied to a MIMO system without change. Equations exemplified in the above embodiments are used to more implicatively represent the technical contents of the present invention, which can be modified to other equivalent equations.

Further, the object of the preferred embodiments and drawings of the present invention is to describe the contents of the present invention in detail, not to limit the scope of the technical spirit of the present invention. In the present invention described above, those skilled in the art will appreciate that various modifications, additions and substitutions are possible, without departing from the technical scope and spirit of the invention as disclosed in the accompanying claims. Therefore, the present invention is not limited to the above embodiments and drawings, but should be appreciated to include scopes equivalent to claims, which will be described later, as well as the claims.

As described above, the present invention provides a wireless communication method and apparatus, which can obtain both a diversity gain and multiplexing gain together by applying multiple antennas to a multi-user domain, thus greatly increasing the system capacity. Especially, the present invention is advantageous in that it can be directly applied to even a MISO system in which only a base station uses multiple antennas, without significantly changing the devices of mobile stations. Further, the present invention is advantageous in that it can obtain both diversity and multiplexing gain together, without regard to environments having a high correlation between the channels according to antennas. Moreover, the present invention is advantageous in that it controls the amount of interference between multiple beams, unlike a conventional orthogonal beam technique, thus always obtaining a multiplexing gain.

What is claimed is:

1. A wireless communication method, in which a transmission stage having M antennas (M is an integer equal to or greater than 1) selects B reception stages (B is an integer equal to or greater than 1) among K reception stages (K is an integer equal to or greater than 1) each having N antennas (N is an integer equal to or greater than 1) and generates B beams to transmit B signals in a multiple-access transmission manner, the method comprising:
   determining a weight vector $w_b=[w_{1,b}, w_{2,b}, \ldots, w_{M,b}]$ required to generate a b-th beam (b is an integer equal to or greater than 1 and equal to or less than B) corresponding to a b-th signal among the B signals so as to determine weights of output values respectively allocated to the M antennas for the purpose of respectively generating the B signals, the weight vector being determined so that respective elements thereof are determined to prevent interference between different beams of the B beams from exceeding a preset threshold; and
   transmitting the B signals through B multiple channels obtained by generating the B beams depending on weights of the elements,
   wherein the respective elements of the weight vector are selected to satisfy a relation of the following equation:

$$\begin{cases} g_i^H w_b = \varepsilon_1, & i \neq b \\ g_i^H w_b = \mu_1, & i = b \end{cases}$$

where i represents an integer equal to or greater than 1 and equal to or less than B, $g_i(t)$ represents a channel selected by a scheduler for an i-th beam, and $\varepsilon_i$ and $\mu_i$ represent preset thresholds.

2. The wireless communication method according to claim 1, wherein the respective beams and channels are designed so that a matrix $W=[w_1, w_2, \ldots, w_B]$ composed of the respective weights of the beams and a matrix $G=[g_1, g_2, \ldots, g_B]$ composed of the channels of the reception stage selected to correspond to the respective beams satisfy a relation $G^H W = F$, which includes a constraint matrix F given by the following equation:

$$F \triangleq \begin{bmatrix} \mu_1 & \varepsilon_1 & \varepsilon_1 & \Lambda & & \varepsilon_1 \\ \varepsilon_2 & \mu_2 & \varepsilon_2 & \Lambda & & \varepsilon_2 \\ \varepsilon_3 & \varepsilon_3 & O & & & M \\ M & & & \mu_{B-1} & \varepsilon_{B-1} \\ \varepsilon_B & \varepsilon_B & \Lambda & & \varepsilon_B & \mu_B \end{bmatrix}$$

where $g_i(t)$ represents a channel selected by a scheduler for an i-th beam.

3. The wireless communication method according to claim 1, further comprising:
comparing a first instantaneous capacity of the entire system obtained when the B beams are used, with a second instantaneous capacity of the entire system obtained when a single beam is used, and transmitting a signal using only a single beam when the first instantaneous capacity is less than the second instantaneous capacity.

4. A wireless communication method, in which a transmission stage having M antennas (M is an integer equal to or greater than 1) selects B reception stages (B is an integer equal to or greater than 1) among K reception stages (K is an integer equal to or greater than 1) each having N antennas (N is an integer equal to or greater than 1) and transmits B signals in a multiple-access transmission manner, the method comprising:
randomly determining weights of elements, a number of which is equal to or less than (M−b+1), of M elements composing a weight vector $w_b = [w_{1,b}, w_{2,b}, \ldots, w_{M,b}]$ so as to determine respective elements of the weight vector required to generate a b-th beam corresponding to a b-th signal among the B signals using the M antennas;
determining weights of remaining (b−1) elements so as to prevent interference of the b-th beam to a channel of another previously selected beam from exceeding a preset threshold; and
determining a reception stage having a maximum Signal-to-Interference plus Noise power Ratio (SINR) with respect to the b-th beam.

5. The wireless communication method according to claim 4, wherein the (M−b+1) weights are randomly determined using a relation of the following equation:

$$(w_{rand})_m = \frac{1}{\sqrt{p_b}} \cdot \sqrt{\alpha_{m,b}}\, e^{j\theta_{m,b}},\, m = 1, 2, \ldots, M - b + 1$$

where $w_{rand}$ represents a part of the weight vector $w_b$ composed of the (M−b+1) weights, $\alpha_{m,b}$ and $\theta_{m,b}$ represent random variables defined in ranges of [0,1] and [0,2π], respectively, while satisfying a normalization constraint of $$\sum_{m=1}^{M} \left|\sqrt{\alpha_{m,b}}\right|^2 = 1,\text{ and } 1/\sqrt{p_b}$$

represents a constant to satisfy a normalization constraint of $\|w_b\|^2 = 1$.

6. The wireless communication method according to claim 5, wherein the remaining (b−1) weights are determined by solving the following linear simultaneous equation:

$$g_i^H w_b = \epsilon,\, i = 1, 2, \ldots, b-1,$$

where $g_i$ represents a channel selected for an i-th beam, and $\epsilon$ represents a preset threshold.

7. The wireless communication method according to claim 6, wherein the remaining (b−1) weights are determined to satisfy the following relation.

$$w_{sol} = \frac{1}{\sqrt{p_b}} \begin{bmatrix} g^*_{M-b+2,1} & g^*_{M-b+3,1} & L & g^*_{M-1,1} & g^*_{M,1} \\ g^*_{M-b+2,2} & g^*_{M-b+3,2} & L & g^*_{M-1,2} & g^*_{M,2} \\ M & & & & M \\ g^*_{M-b+2,b-2} & & & O & g^*_{M,b-2} \\ g^*_{M-b+2,b-1} & g^*_{M-b+3,b-1} & L & g^*_{M-1,b-1} & g^*_{M,b-1} \end{bmatrix}^{-1} \begin{bmatrix} \varepsilon - \sum_{m=1}^{M-b+1} g^*_{m,1} \sqrt{\alpha_{m,b}}\, e^{j\theta_{m,b}} \\ \varepsilon - \sum_{m=1}^{M-b+1} g^*_{m,2} \sqrt{\alpha_{m,b}}\, e^{j\theta_{m,b}} \\ M \\ \varepsilon - \sum_{m=1}^{M-b+1} g^*_{m,b-1} \sqrt{\alpha_{m,b}}\, e^{j\theta_{m,b}} \end{bmatrix}.$$

8. The wireless communication method according to claim 4, further comprising:
comparing a first instantaneous capacity of the entire system obtained when the B beams are used, with a second instantaneous capacity of the entire system obtained when a single beam is used, and transmitting a signal using only a single beam when the first instantaneous capacity is less than the second instantaneous capacity.

9. A wireless communication apparatus, in which a transmission stage having M antennas (M is an integer equal to or greater than 1) selects B reception stages (B is an integer equal to or greater than 1) among K reception stages (K is an integer equal to or greater than 1) each having N antennas (N is an integer equal to or greater than 1) and generates B beams to transmit B signals in a multiple-access transmission manner, the apparatus comprising:
means determining a weight vector $w_b = [w_{1,b}, w_{2,b}, \ldots, w_{M,b}]$ required to generate a b-th beam (b is an integer equal to or greater than 1 and equal to or less than B) corresponding to a b-th signal among the B signals so as to determine weights of output values respectively allocated to the M antennas for the purpose of respectively generating the B signals, the means determining respective elements of the weight vector to prevent interference between different beams of the B beams from exceeding a preset threshold; and means transmitting the B signals through B multiple channels obtained by generating the B beams depending on weights of the elements, wherein the respective elements of the weight vector are selected to satisfy a relation of the following equation:

$$\begin{cases} g_i^H w_b = \varepsilon_1, & i \neq b \\ g_i^H w_b = \mu_1, & i = b \end{cases}$$

where i represents an integer equal to or greater than 1 and equal to or less than B, $g_i(t)$ represents a channel selected by a scheduler for an i-th beam, and $\epsilon_i$ and $\mu_i$ represent preset thresholds.

10. The wireless communication apparatus according to claim 9, further comprising means comparing a first instantaneous capacity of the entire system obtained when the B beams are used, with a second instantaneous capacity of the entire system obtained when a single beam is used, and transmitting a signal using only a single beam when the first instantaneous capacity is less than the second instantaneous capacity.

11. A wireless communication apparatus, in which a transmission stage having M antennas (M is an integer equal to or greater than 1) selects B reception stages (B is an integer equal to or greater than 1) among K reception stages (K is an integer equal to or greater than 1) each having N antennas (N is an integer equal to or greater than 1) and transmits B signals in a multiple-access transmission manner, the apparatus comprising:

means randomly determining weights of elements, a number of which is equal to or less than (M−b+1), of M elements composing a weight vector $w_b=[w_{1,b}, w_{2,b}, \ldots, w_{M,b}]$ so as to determine respective elements of the weight vector required to generate a b-th beam corresponding to a b-th signal among the B signals using the M antennas;

means determining weights of remaining b−1 elements so as to prevent interference of the b-th beam to a channel of another previously selected beam from exceeding a preset threshold; and means determining a reception stage having a maximum Signal-to-Interference plus Noise power Ratio (SINR) with respect to the b-th beam.

12. The wireless communication apparatus according to claim 11, further comprising means comparing a first instantaneous capacity of the entire system obtained when the B beams are used, with a second instantaneous capacity of the entire system obtained when a single beam is used, and transmitting a signal using only a single beam when the first instantaneous capacity is less than the second instantaneous capacity.

* * * * *

UNITED STATES PATENT AND TRADEMARK OFFICE
CERTIFICATE OF CORRECTION

PATENT NO.      : 7,437,182 B2
APPLICATION NO. : 10/836588
DATED           : October 14, 2008
INVENTOR(S)     : Lee et al.

It is certified that error appears in the above-identified patent and that said Letters Patent is hereby corrected as shown below:

(1) On the title page, Item (75) Inventors, line 3, "141-744 Seoul (KR)"
should read -- 151-744 Seoul (KR) --
(See the Declaration mailed with the application of September 1, 2004.)

Column 12, Claim 1, lines 60 and 61,

"$\begin{cases} \mathbf{g}_i^H \mathbf{w}_b = \varepsilon_i, & i \neq b \\ \mathbf{g}_i^H \mathbf{w}_b = \mu_i, & i = b \end{cases}$" should read -- $\begin{cases} g_i^H w_b = \varepsilon_1, & i \neq b \\ g_i^H w_b = \mu_1, & i = b \end{cases}$ --

Column 14, Claim 7, right side of equation, after the second entry, the "M" is missing.

"$w_{sol} = \frac{1}{\sqrt{P_b}} \begin{bmatrix} g^*_{M-b+2,1} & g^*_{M-b+3,1} & L & g^*_{M-1,1} & g^*_{M,1} \\ g^*_{M-b+2,2} & g^*_{M-b+3,2} & L & g^*_{M-1,2} & g^*_{M,2} \\ M & & & & M \\ g^*_{M-b+2,b-2} & & & O & g^*_{M,b-2} \\ g^*_{M-b+2,b-1} & g^*_{M-b+3,b-1} & L & g^*_{M-1,b-1} & g^*_{M,b-1} \end{bmatrix}^{-1} \begin{bmatrix} \varepsilon - \sum_{m=1}^{M-b+1} g^*_{m,1} \sqrt{\alpha_{m,b}} e^{j\theta_{m,b}} \\ \varepsilon - \sum_{m=1}^{M-b+1} g^*_{m,2} \sqrt{\alpha_{m,b}} e^{j\theta_{m,b}} \\ \\ \varepsilon - \sum_{m=1}^{M-b+1} g^*_{m,b-1} \sqrt{\alpha_{m,b}} e^{j\theta_{m,b}} \end{bmatrix}$"

Claim 7, right side of the equation, should read:

-- $w_{sol} = \frac{1}{\sqrt{P_b}} \begin{bmatrix} g^*_{M-b+2,1} & g^*_{M-b+3,1} & L & g^*_{M-1,1} & g^*_{M,1} \\ g^*_{M-b+2,2} & g^*_{M-b+3,2} & L & g^*_{M-1,2} & g^*_{M,2} \\ M & & & & M \\ g^*_{M-b+2,b-2} & & & O & g^*_{M,b-2} \\ g^*_{M-b+2,b-1} & g^*_{M-b+3,b-1} & L & g^*_{M-1,b-1} & g^*_{M,b-1} \end{bmatrix}^{-1} \begin{bmatrix} \varepsilon - \sum_{m=1}^{M-b+1} g^*_{m,1} \sqrt{\alpha_{m,b}} e^{j\theta_{m,b}} \\ \varepsilon - \sum_{m=1}^{M-b+1} g^*_{m,2} \sqrt{\alpha_{m,b}} e^{j\theta_{m,b}} \\ M \\ \varepsilon - \sum_{m=1}^{M-b+1} g^*_{m,b-1} \sqrt{\alpha_{m,b}} e^{j\theta_{m,b}} \end{bmatrix}$ --

UNITED STATES PATENT AND TRADEMARK OFFICE
CERTIFICATE OF CORRECTION

PATENT NO.       : 7,437,182 B2
APPLICATION NO.  : 10/836588
DATED            : October 14, 2008
INVENTOR(S)      : Lee et al.

It is certified that error appears in the above-identified patent and that said Letters Patent is hereby corrected as shown below:

Column 15, lines 14 and 15 of Claim 9:

" $\begin{cases} g_i^H w_b = \varepsilon_1, & i \neq b \\ g_i^H w_b = \mu_1, & i = b \end{cases}$ " should read -- $\begin{cases} \mathbf{g}_i^H \mathbf{w}_b = \varepsilon_i, & i \neq b \\ \mathbf{g}_i^H \mathbf{w}_b = \mu_i, & i = b \end{cases}$ --

Signed and Sealed this

Third Day of March, 2009

JOHN DOLL
*Acting Director of the United States Patent and Trademark Office*

UNITED STATES PATENT AND TRADEMARK OFFICE
CERTIFICATE OF CORRECTION

PATENT NO.        : 7,437,182 B2
APPLICATION NO. : 10/836588
DATED             : October 14, 2008
INVENTOR(S)       : Lee et al.

It is certified that error appears in the above-identified patent and that said Letters Patent is hereby corrected as shown below:

(1) On the title page, Item (75) Inventors, line 3, "141-744 Seoul (KR)" should read -- 151-744 Seoul (KR) --
(See the Declaration mailed with the application of September 1, 2004.)

Column 12, Claim 1, lines 60 and 61,

"$\begin{cases} \mathbf{g}_i^H \mathbf{w}_b = \varepsilon_i, & i \neq b \\ \mathbf{g}_i^H \mathbf{w}_b = \mu_i, & i = b \end{cases}$" should read $\begin{cases} g_i^H w_b = \varepsilon_1, & i \neq b \\ g_i^H w_b = \mu_i, & i = b \end{cases}$ --

Column 14, Claim 7, right side of equation, after the second entry, the "M" is missing.

"$$w_{sol} = \frac{1}{\sqrt{P_b}} \begin{bmatrix} g^*_{M-b+2,1} & g^*_{M-b+3,1} & L & g^*_{M-1,1} & g^*_{M,1} \\ g^*_{M-b+2,2} & g^*_{M-b+3,2} & L & g^*_{M-1,2} & g^*_{M,2} \\ M & & & & M \\ g^*_{M-b+2,b-2} & & & O & g^*_{M,b-2} \\ g^*_{M-b+2,b-1} & g^*_{M-b+3,b-1} & L & g^*_{M-1,b-1} & g^*_{M,b-1} \end{bmatrix}^{-1} \begin{bmatrix} \varepsilon - \sum_{m=1}^{M-b+1} g^*_{m,1} \sqrt{\alpha_{m,b}} e^{j\theta_{m,b}} \\ \varepsilon - \sum_{m=1}^{M-b+1} g^*_{m,2} \sqrt{\alpha_{m,b}} e^{j\theta_{m,b}} \\ \varepsilon - \sum_{m=1}^{M-b+1} g^*_{m,b-1} \sqrt{\alpha_{m,b}} e^{j\theta_{m,b}} \end{bmatrix}$$"

Claim 7, right side of the equation, should read:

-- $$w_{sol} = \frac{1}{\sqrt{P_b}} \begin{bmatrix} g^*_{M-b+2,1} & g^*_{M-b+3,1} & L & g^*_{M-1,1} & g^*_{M,1} \\ g^*_{M-b+2,2} & g^*_{M-b+3,2} & L & g^*_{M-1,2} & g^*_{M,2} \\ M & & & & M \\ g^*_{M-b+2,b-2} & & & O & g^*_{M,b-2} \\ g^*_{M-b+2,b-1} & g^*_{M-b+3,b-1} & L & g^*_{M-1,b-1} & g^*_{M,b-1} \end{bmatrix}^{-1} \begin{bmatrix} \varepsilon - \sum_{m=1}^{M-b+1} g^*_{m,1} \sqrt{\alpha_{m,b}} e^{j\theta_{m,b}} \\ \varepsilon - \sum_{m=1}^{M-b+1} g^*_{m,2} \sqrt{\alpha_{m,b}} e^{j\theta_{m,b}} \\ M \\ \varepsilon - \sum_{m=1}^{M-b+1} g^*_{m,b-1} \sqrt{\alpha_{m,b}} e^{j\theta_{m,b}} \end{bmatrix}$$ --

UNITED STATES PATENT AND TRADEMARK OFFICE
CERTIFICATE OF CORRECTION

PATENT NO. : 7,437,182 B2
APPLICATION NO. : 10/836588
DATED : October 14, 2008
INVENTOR(S) : Lee et al.

It is certified that error appears in the above-identified patent and that said Letters Patent is hereby corrected as shown below:

Column 15, lines 14 and 15 of Claim 9:

" $\begin{cases} g_i^H w_b = \varepsilon_1, & i \neq b \\ g_i^H w_b = \mu_1, & i = b \end{cases}$ " should read -- $\begin{cases} \mathbf{g}_i^H \mathbf{w}_b = \varepsilon_i, & i \neq b \\ \mathbf{g}_i^H \mathbf{w}_b = \mu_i, & i = b \end{cases}$ --

This certificate supersedes the Certificate of Correction issued March 3, 2009.

Signed and Sealed this

Sixth Day of October, 2009

David J. Kappos
*Director of the United States Patent and Trademark Office*

UNITED STATES PATENT AND TRADEMARK OFFICE
CERTIFICATE OF CORRECTION

PATENT NO.        : 7,437,182 B2                                    Page 1 of 2
APPLICATION NO.   : 10/836588
DATED             : October 14, 2008
INVENTOR(S)       : Lee et al.

It is certified that error appears in the above-identified patent and that said Letters Patent is hereby corrected as shown below:

(1) On the title page, Item (75) Inventors, line 3, "141-744 Seoul (KR)"
should read -- 151-744 Seoul (KR) --
(See the Declaration mailed with the application of September 1, 2004.)

Column 12, Claim 1, lines 60 and 61, should read $$-- \begin{cases} \mathbf{g}_i^H \mathbf{w}_b = \varepsilon_i, & i \neq b \\ \mathbf{g}_i^H \mathbf{w}_b = \mu_i, & i = b \end{cases} --$$

Column 14, Claim 7, right side of equation, after the second entry, the "M" is missing.

$$`` w_{sol} = \frac{1}{\sqrt{P_b}} \begin{bmatrix} g_{M-b+2,1}^* & g_{M-b+3,1}^* & L & g_{M-1,1}^* & g_{M,1}^* \\ g_{M-b+2,2}^* & g_{M-b+3,2}^* & L & g_{M-1,2}^* & g_{M,2}^* \\ M & & & & M \\ g_{M-b+2,b-2}^* & & & O & g_{M,b-2}^* \\ g_{M-b+2,b-1}^* & g_{M-b+3,b-1}^* & L & g_{M-1,b-1}^* & g_{M,b-1}^* \end{bmatrix}^{-1} \begin{bmatrix} \varepsilon - \sum_{m=1}^{M-b+1} g_{m,1}^* \sqrt{\alpha_{m,b}} e^{j\theta_{m,b}} \\ \varepsilon - \sum_{m=1}^{M-b+1} g_{m,2}^* \sqrt{\alpha_{m,b}} e^{j\theta_{m,b}} \\ \varepsilon - \sum_{m=1}^{M-b+1} g_{m,b-1}^* \sqrt{\alpha_{m,b}} e^{j\theta_{m,b}} \end{bmatrix} ''$$

Claim 7, right side of the equation, should read:

$$-- w_{sol} = \frac{1}{\sqrt{P_b}} \begin{bmatrix} g_{M-b+2,1}^* & g_{M-b+3,1}^* & L & g_{M-1,1}^* & g_{M,1}^* \\ g_{M-b+2,2}^* & g_{M-b+3,2}^* & L & g_{M-1,2}^* & g_{M,2}^* \\ M & & & & M \\ g_{M-b+2,b-2}^* & & & O & g_{M,b-2}^* \\ g_{M-b+2,b-1}^* & g_{M-b+3,b-1}^* & L & g_{M-1,b-1}^* & g_{M,b-1}^* \end{bmatrix}^{-1} \begin{bmatrix} \varepsilon - \sum_{m=1}^{M-b+1} g_{m,1}^* \sqrt{\alpha_{m,b}} e^{j\theta_{m,b}} \\ \varepsilon - \sum_{m=1}^{M-b+1} g_{m,2}^* \sqrt{\alpha_{m,b}} e^{j\theta_{m,b}} \\ M \\ \varepsilon - \sum_{m=1}^{M-b+1} g_{m,b-1}^* \sqrt{\alpha_{m,b}} e^{j\theta_{m,b}} \end{bmatrix} --$$

CERTIFICATE OF CORRECTION (continued)
U.S. Pat. No. 7,437,182 B2

Column 15, lines 14 and 15 of Claim 9:

" $\begin{cases} g_i^H w_b = \varepsilon_1, & i \neq b \\ g_i^H w_b = \mu_1, & i = b \end{cases}$ " should read -- $\begin{cases} \mathbf{g}_i^H \mathbf{w}_b = \varepsilon_i, & i \neq b \\ \mathbf{g}_i^H \mathbf{w}_b = \mu_i, & i = b \end{cases}$ --

This certificate supersedes the Certificates of Correction issued March 3, 2009 and October 6, 2009.

Signed and Sealed this

Thirtieth Day of March, 2010

David J. Kappos
*Director of the United States Patent and Trademark Office*